United States Patent [19]
Reitzig

[11] 3,836,970
[45] Sept. 17, 1974

[54] ANTENNA ARRAY FOR AIRCRAFT NAVIGATION SYSTEM

[75] Inventor: Rafael Reitzig, Munich, Germany

[73] Assignee: Siemens Aktiengesellschaft, Berlin & Munich, Germany

[22] Filed: May 19, 1972

[21] Appl. No.: 254,893

[30] Foreign Application Priority Data
June 8, 1971 Germany............................ 2128524

[52] U.S. Cl.. 343/100 ST, 343/100 SA, 343/112 C, 343/112 R, 343/117 R
[51] Int. Cl. ............................................. H01q 3/26
[58] Field of Search .... 343/100 ST, 100 SA, 117 R, 343/854, 112 C, 112 R

[56] References Cited
UNITED STATES PATENTS
| | | | |
|---|---|---|---|
| 3,042,917 | 7/1962 | Elhoff | 343/117 R |
| 3,560,975 | 2/1971 | Manuali | 343/100 ST |
| 3,699,324 | 10/1972 | Iliff | 343/117 R |

OTHER PUBLICATIONS
Wray, "The Goonhilly Aerial Control System," Industrial Electronics, Feb. 1963, pp. 278–282.

Primary Examiner—Maynard R. Wilbur
Assistant Examiner—Richard E. Berger
Attorney, Agent, or Firm—Hill, Gross, Simpson, Van Santen, Steadman, Chiara & Simpson

[57] ABSTRACT

An electronically phased control antenna array having a number of radiators which are to be controlled so as to form two beams respectively pointed toward two separate earth satellites in an aeronautical satellite navigation system and wherein the two antenna arrays are controlled through a Butler matrix comprising a distribution network having phase rotation elements and wherein a plurality of outputs which differ in phase are selectively obtained so as to control the direction of the antenna beam, thus maintaining the antenna arrays respectively pointed at the satellites. The selection of the switching control for the matrices which control the antenna arrays may be accomplished by the use of a computer which has a memory for programming the switching in response to a prior flight path over the same region. Alternatively, the outputs from the antenna arrays and matrix may be sampled and the switches of the matrices controlled so as to obtain the largest signal thus assuring that the arrays are pointing toward the satellites.

11 Claims, 8 Drawing Figures

Fig. 1
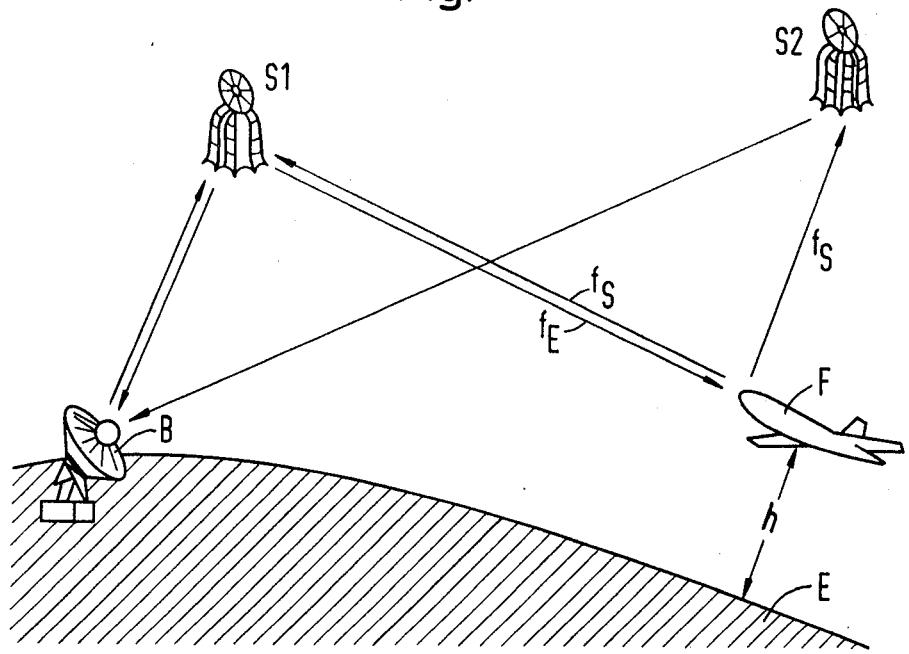
Fig. 2A
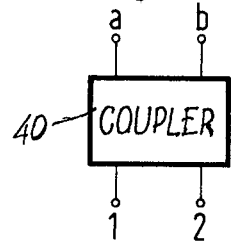
Fig. 2B
| | a | b |
|---|---|---|
| 1 | $\frac{1}{\sqrt{2}} \angle 0°$ | $\frac{1}{\sqrt{2}} \angle -90°$ |
| 2 | $\frac{1}{\sqrt{2}} \angle -90°$ | $\frac{1}{\sqrt{2}} \angle 0°$ |
Fig. 3
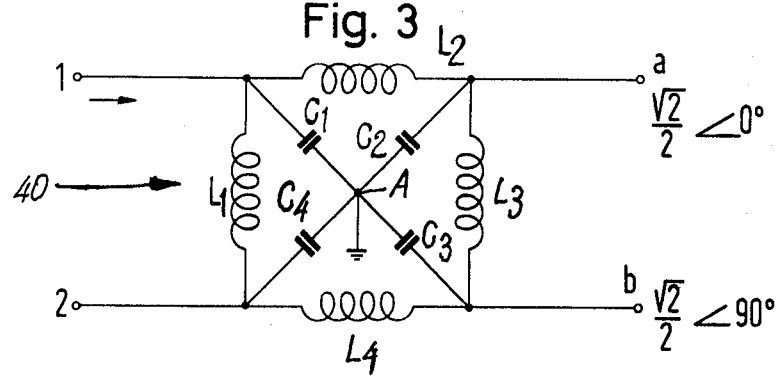

|       | $A_1$  | $A_2$  | $A_3$  | $A_4$  |
|-------|--------|--------|--------|--------|
| $I_1$ | 0°     | -90°   | -90°   | -180°  |
| $I_2$ | -90°   | -180°  | 0°     | -90°   |
| $I_3$ | -90°   | 0°     | -180°  | -90°   |
| $I_4$ | -180°  | -90°   | -90°   | 0°     |

ANTENNA ARRAY FOR AIRCRAFT NAVIGATION SYSTEM

BACKGROUND OF THE INVENTION

1. Field of the Invention

This invention relates in general to aircraft navigation systems utilizing directive antenna and particularly to a control system for antenna arrays so as to point the beams of the arrays continually at two separate earth satellites as the arrays move with an aircraft relative to the earth.

2. Description of the Prior Art

Aircraft navigation systems for use over oceans have used equipment carried on board the aircraft for determining position. Such systems as Loran, Omega, Consol and Inertial Navigation systems do not have the capability of indicating to aircraft their positions relative to other aircraft and thus danger of collisions exists. In addition, improved control of airspace would be obtained if aircraft were capable of transmitting position data to other aircraft so that checks could be made of various navigation systems and thus improve the overall accuracy of navigation.

Improved control of aircraft and communications has resulted from the use of earth satellites. In the spheric method of navigation which is cheap and very reliable, the aircraft's position may be determined by the point of intersection of three spherical shells. The first shell is determined by the aircraft's distance from the center of the earth which can be determined by an altimeter carried on board the aircraft which measures its altitude above the earth's surface. The other spherical shells are determined by the distances of the aircraft from two synchronous satellites placed above the surface of the earth and thus the aircraft's position is continually known if the distance to the two satellites is known. For instance, on the route across the Atlantic Ocean, the angular distance between two satellites will be about 40°. A choice may now be made whether the position information will be utilized for independent airspace control or even for anticollision.

The total cost of aircraft navigation systems is minimized when the computing systems are ground based such that a single system can be used with many aircraft and wherein the aircraft mounted system is simple. Such systems have been known wherein a ground control station transmits to an aircraft via one or two satellites an interrogation signal which causes a particular aircraft to respond to the ground station with a signal which is returned via each of the two satellites and which also carries the aircraft's altitude. This signal has a phase relationship which indicates the distance between the aircraft and each satellite. The ground station upon reception of the two received signals from the two separate satellites is capable of calculating the aircraft's position from the altitude and the aircraft's distance from the two satellites which information is contained in the received signal.

For accuracy it is desired that the antenna system aboard the aircraft suppress indirect signals and multipath signals which do not travel via the two satellites. This is because reflected signals are superimposed on the signal via the satellites and have different phases or delays and comprise noise and interfere with the correct phase of the signal which has passed to and from the aircraft via the satellites. By obtaining highly directive antennas on the aircraft the direct and multipath reflection signals can be substantially attenuated so as to reduce interference therefrom.

An ideal radiation pattern would be a hemispherical beam which covered the space above the aircraft and which did not respond to any signals from beneath the aircraft. Such an antenna beam would simultaneously cover both satellites, however, antenna arrays for forming such beams are many times larger than arrays that can be efficiently mounted on aircraft. Aircraft antenna must be light and compact and must not interfere with the structural strength of the airframe and also must not interfere with the aerodynamic characteristics of the aircraft. Thus antennas which extend from the aircraft body cannot be used with supersonic aircraft. Also, such antennas must be usable in the aircraft environment and resist changes in temperature, moisture, shock and vibration.

The absolute gain of the antenna primarily depends on the channel capacity of the aircraft transponder and the energy radiated in the satellite-airplane link.

The simplest antenna system would be an individual radiator element mounted in the upper part of the airplane fuselage. The spiral antenna and the cross-slot antenna have desirable characteristics for circular polarization and a slot antenna and a ring-slot antenna have vertical polarization. Such radiating elements may be favorably used in aircraft in that they can be mounted in the skin of the aircraft without substanitally decreasing the aerodynamic profile of the aircraft.

The radiation gain of an ideal antenna with spherical beam is 3 db. The gain of an individual radiator, however, is in the order of 5–7 db. When the beam is focused and the coverage of at least 0 db will be obtained within a limited solid angle range. The angle dependency relative to the vertical and horizontal field component is almost the same so that essentially circular polarization will be obtained. The horizontal polarized components of a circular polarized wave will be short-circuited by the metallic skin of an aircraft. The suppression of multipath signals may be improved in this manner.

However, the sensitivity for receiving desired signals which have a small elevation angle is strongly reduced. If antennas of this type are mounted on both sides of the aircraft, the coverage will be improved but reflected signals from the surface of the water will not be suppressed. Simultaneous operation of both antennas is not feasible in the upper coverage range because of interference, however, this is not required on the North Atlantic Route since only one antenna would have to operate during a flight. This would not be true for flights between Europe and South America, however, Individual radiators are thus not particularly suited for such navigation systems except maybe to fill up the energy balance for the airplane-satellite path and they would have the disadvantage in that they would increase the cost of the entire system.

A particular critical component in the aircraft-satellite system is usually the communication transmission link. Although simultaneous operation via both satellites is required for navigation, the communication transmission can pass via a single satellite. Thus, sufficient suppression of multipath signals and avoidance of interferences between the navigation and communication system cannot be obtained by one or two individual radiators either singly or in combination.

SUMMARY OF THE INVENTION

The present invention provides an antenna array which solves the problems of the prior art in a novel and practical manner. According to the present invention, an antenna system for an aircraft navigation and communication equipment comprises a surface-like electronically phase-controlled array with a number of individual radiators mounted on the aircraft and which are controlled for producing several mutually independent beams at one operational frequency and which are controlled by a Butler matrix comprising a line distribution network made of coupled networks and fixed phase rotation members and wherein the number of inputs generally corresponds to the number of individual radiators. Thus, such arrays are controllable so that the antenna beam may be positioned to a number of discrete directions corresponding to the number of radiator elements. A computer may be carried on board the aircraft in which its memory has a record of a prior flight path which it is desired to travel and which controls the beam of the antenna array through the Butler matrix so as to continually align the beam with the particular satellite via which transmission and reception of intelligence is being accomplished. An alternate system comprises a threshold value detector which examines in sequence all of the possible beam directions and selects the particular beam which is optimum for the particular position of the aircraft and satellite at that particular time.

By switching the input to the exciter matrix, the antenna beam direction is determined and this particular beam will be used as long as it is the optimum beam for the particular satellite.

The advantage of the matrix according to this invention is that it allows several mutually independent beams to be obtained at one operational frequency. Since the beam directions are fixed in space and are not always exactly pointed toward the satellite position, variations in gain are possible during the flight. Thus, in a threshold switch-over device the switch to a different beam will be made at the signal level wherein the two adjacent beams intersect. Thus by calculating the curves of equal gain for the various beams the coverage diagram of the antenna beams of the system can be obtained.

The control matrix for switching the antenna beam may be installed in either the radio frequency portion or the intermediate frequency portion of the equipment. When the antenna is fed by a central transmitter an exciter matrix in the radio frequency stages is feasible. The line losses in the network, however, have to be taken into account when the over-all system gain is determined. Such losses can be avoided when an active transmitting-receiving element is behind each individual radiator and the control is in the intermediate frequency stage and is carried out by a suitable matrix.

The decoupled networks in the matrix can be 3 db couplers. Such couplers are provided with two inputs and two outputs whereby while feeding at one input two signals which differ from each other by 90° are obtained at the outputs. On the other hand if the feed is switched to the other input an opposite phase with respect to the first case will occur.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a schematic view of an aircraft navigation system utilizing two earth satellites and a ground station;

FIG. 2A illustrates a coupler;

FIG. 2B is a chart illustrating the relationship between signals at the inputs and outputs of the coupler of FIG. 2A;

FIG. 3 is an electrical schematic of a coupler according to FIG. 2A;

DESCRIPTION OF THE PREFERRED EMBODIMENTS

Figures 4, 5:
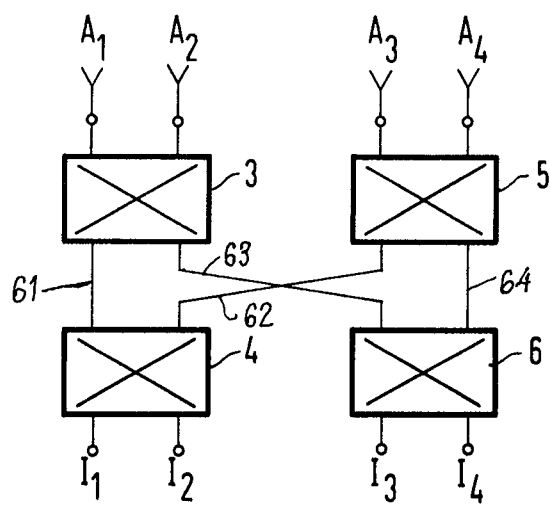
FIG. 4 illustrates an excitor matrix for radiator elements.
FIG. 5 is a chart illustrating the phase relationships of the signals in the matrix of FIG. 4.

FIG. 1 illustrates the navigation and communication problem for over water navigation, for example. A ground station B transmits an interrogation signal via one of two synchronous satellites S1 and S2 to an aircraft F. Aircraft F receives the interrogation signal in FIG. 1 from the ground station via the satellite S1. The frequency of the interrogation signal after being processed by the satellite S1 is $f_E$. The aircraft transmits a phase modulated signal $f_S$ which is detected by the satellites S1 and S2 which then re-radiate this signal to the ground station B. The phase relationship of the signal between the aircraft F and the satellites S1 and S2 are indicative of the distance between the aircraft and the satellites and this information is detected at the ground station and converted into distance of the aircraft from the satellites S1 and S2. The aircraft also modulates its altitude on the signal which is transmitted to the ground station via the satellites and the ground station can then determine the aircraft's position from the aircraft's altitude $h$ and its distance from the satellites S1 and S2. The signal transmitted by the aircraft F is modulated with several tone frequencies. The system of FIG. 1 requires that the aircraft have antenna systems which can receive and transmit signals simultaneously via the two satellites S1 and S2.

In the present invention, an antenna system for an aircraft is provided which comprises an antenna array which is controllable such that the beam of the antenna will align with the satellite S1. A second antenna array mounted on the aircraft is controllable so that it will align with the satellite S2.

FIG. 2A illustrates a coupler 40 which has input terminals 1 and 2 and output terminals $a$ and $b$. Table FIG. 2B illustrates the amplitude and phase relationship of the signals at the outputs $a$ and $b$ respectively when an input is applied to one of the two input terminals 1 and 2, which has a standard amplitude magnitude of 1. For example, when an input is applied to input terminal 1 an output at output terminal $a$ will be $1/\sqrt{2}$ and this signal will have a phase angle of 0°. Whereas at the same time a signal of the same amplitude will appear at terminal $b$ which lags the signal at terminal $a$ by 90°. If the input is applied at terminal 2 instead of terminal 1, the output at terminal $b$ will be $1/\sqrt{2}$ at a 0° phase angle and the output at terminal $a$ will have the same amplitude but will lag the output at terminal $b$ by 90° as shown by the table of FIG. 2B.

FIG. 3 is an electrical schematic of the coupler of FIG. 2A and it is to be noted that the terminals 1 and $a$ are separated by an inductance $L_2$. The terminals 2 and $b$ are separated by an inductance $L_4$. An inductance $L_1$ is connected between terminals 1 and 2 and an inductance $L_3$ is connected between terminals $a$ and $b$. A pair of capacitors $C_1$ and $C_3$ are connected in series between terminals 1 and $b$ and a pair of capacitors $C_4$ and $C_2$ are connected between termainsl 2 and $a$. The capacitors $C_1$-$C_4$ have second sides connected together at point A which is grounded. The 3 db coupler of FIG. 3 may be constructed with integrated circuit techniques and for use in the microwave frequency range might be constructed of quarter-wave line elements and corresponding impedance converters.

FIG. 4 illustrates an excitor matrix for an antenna array having four radiator elements which can be controlled such that the array radiates beams in four different directions. The matrix consists of four interconnected 3 db couplers 3, 4, 5 and 6 which may be identical to the coupler 40 illustrated in FIGS. 2A and 3. For example, the antennas $A_1$ and $A_2$ are connected to the output terminals of coupler 3. Coupler 4 has a pair of input terminals $I_1$ and $I_2$ and supplies a first input to the coupler 3 through a lead 61. The coupler 4 supplies an input to the coupler 5 through a lead 62. Coupler 6 supplies an input to the coupler 3 through the lead 63 and supplies an input by lead 64 to the coupler 5. The antenna elements $A_3$ and $A_4$ are connected to the outputs of the coupler 5.

The table FIG. 5 illustrates the relationship of the outputs at the antennas $A_1$-$A_4$ as inputs are selectively applied to the input terminals $I_1$-$I_4$ due to the phase rotation of the couplers 3, 4, 5 and 6 and the manner in which they are interconnected as shown in FIG. 4. For example, when an input is supplied to terminal $I_1$ of coupler 4, the output at element $A_1$ will have 0° phase, the outputs at elements $A_2$ and $A_3$ will have −90° phase relationship and the output at element $A_4$ will have a phase relationship of −180°. Thus the antenna array comprising the antenna elements of $A_1$-$A_4$ will produce a beam in a particular first direction. When an input is applied to terminal $I_2$ the output at radiator element $A_3$ will have 0° phase relationship and the outputs at radiators $A_1$ and $A_4$ will have phase relationships of −90° whereas the output at element $A_2$ will have a phase relationship of −180°. Thus a beam will be produced under these conditions which will have a direction which is different from that of the beam produced when an input is received at terminal $I_1$. Likewise, two additional beams having different directions will be produced by inputs applied to terminals $I_3$ and $I_4$ respectively as shown by the table of FIG. 5.

Better directivity than that available with four element arrays are obtainable by an array of six radiating elements formed in two rows of three elements each. A minimum gain of about 5 db can be obtained including polarization losses with a single array of this configuration mounted on the upper side of the airframe. Cross slot antennas operate very well as individual radiators. Multiple path signal suppression is good with cross slot antennas because they are substantially vertically polarized in the range of low elevation angles. If higher gains are required it is possible to arrange an antenna array of fixed radiator elements on both sides of the airframe. Other configurations may also be selected such as a group of 3 × 3 of three rows of three radiating elements, or 4 × 4 with four rows of four radiating elements which are mounted on the uppser surface of the airframe.

Figure 6:
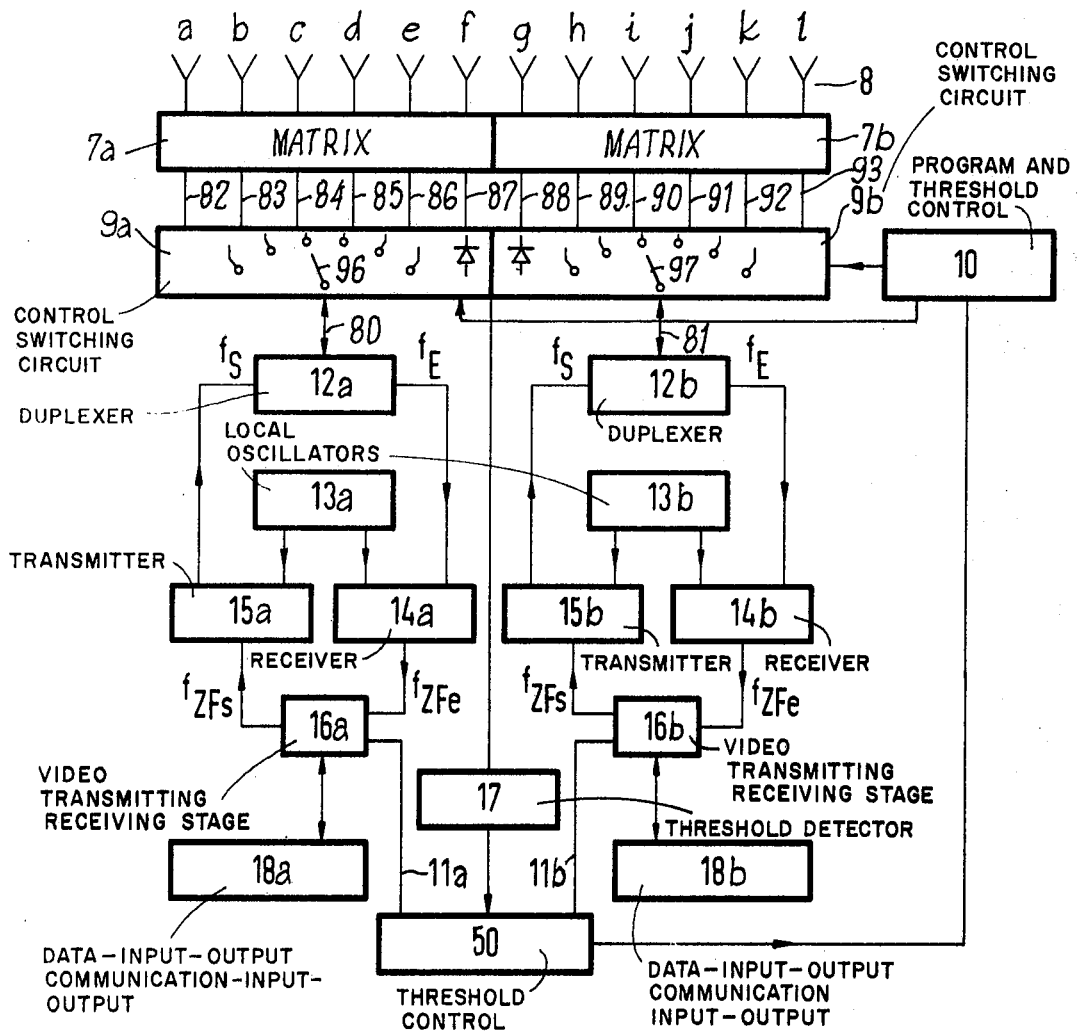
FIG. 6 is a block diagram of an aircraft transponder according to the invention wherein the matrix and switching is accomplished in the radio frequency stage.

FIG. 6 is a block diagram of an aircraft transponder system for operation with two satellites wherein the switching matrix for the antenna system is in the radio frequency stage. A first group of antennas designated $8a$ through $8f$ are controlled to direct a beam toward a first satellite and a second plurality of antennas $8g$ through $8l$ are controlled to direct a beam toward a second satellite. A first matrix $7a$ is connected to the radiators $8a$-$8f$ and a second matrix $7b$ is connected to the radiator $8g$-$8l$. The matrices $7a$ and $7b$ may be the same type as described in FIGS. 3 and 4 which produce a beam which has a direction dependent upon the inputs applied to the matrix.

A first control switching circuit $9a$ receives an input from the program or threshold control 10 so as to close switch 96 to engage one of the leads 82–87 to the matrix $7a$. An input-output lead 80 is connected to switch contact 96 and continuity between one of the contacts 82–87 depends upon the position of the switch 96. Thus the setting of the switch 96 determines the direction of the beam of the antenna array comprising the antenna elements $8a$-$8f$. The switching circuit $9b$ is connected by leads 88–93 to the matrix $7b$ and has a switch 97 which is controlled by the program and threshold control 10 so as to provide continuity between the input-output lead 81 and the leads 88–93. Thus, the program and threshold control 10 determines the directivity of the beam of the antenna array comprising the elements $8g$-$8l$.

The switches $9a$ and $9b$ might be microwave switches or diode switches and may be controlled by the program control in response to a preset program established in the control 10 and based on prior flights made over the same route. Alternatively, they may be established by a threshold detector 17 which scans the outputs over leads 82–87 and 88–93, respectively, so as to determine the position of the two beams for optimum operation. A threshold control 50 receives the output of the threshold detector 17 and supplies an input to the program or threshold control 10 so as to position the switches 96 and 97.

The navigation and communication radiating and receiving processing systems may be identical for the two satellites. The system connected to the matrix $7a$, for example, may include a duplexer $12a$ which separates the transmitting frequency $f_S$ from the receiving frequency $f_E$. A local oscillator $13a$ supplies an injection frequency to the mixers of a transmitter $15a$ and a receiver $14a$. A video transmitting-receiving stage $16a$ receives an intermediate frequency $f_{ZF_e}$ from the receiver $14a$ and supplies an intermediate frequency signal $f_{ZF_s}$ to the transmitter $15a$. A data input-output and communication input-output 18a is connected to the video receving and transmitting system 16a. The antenna array comprising the antennas 8g–8l are connected to a similar system comprising the duplexer 12b, transmitter 15b and receiver 14b which receive injection signals from the local oscillator 13b. A video transmitting-receiving stage 16b receives an intermediate frequency $f_{ZFe}$ from the receiver 14b and supplies an intermediate frequency signal $f_{ZFs}$ to the transmitter 15b. Data-input communication input-output 18b is connected to the video transmitting-receiving unit 16b. Lead 11a connects the threshold control 50 to the video receiver-transmitter 16a and lead 16b connects the control 50 to the video receiving-transmitting stage 16b.

The system of FIG. 6 illustrates apparatus wherein matrices are connected in the radio frequency stages of the equipment to accomplish the control of the direction of the beams.

Figure 7:
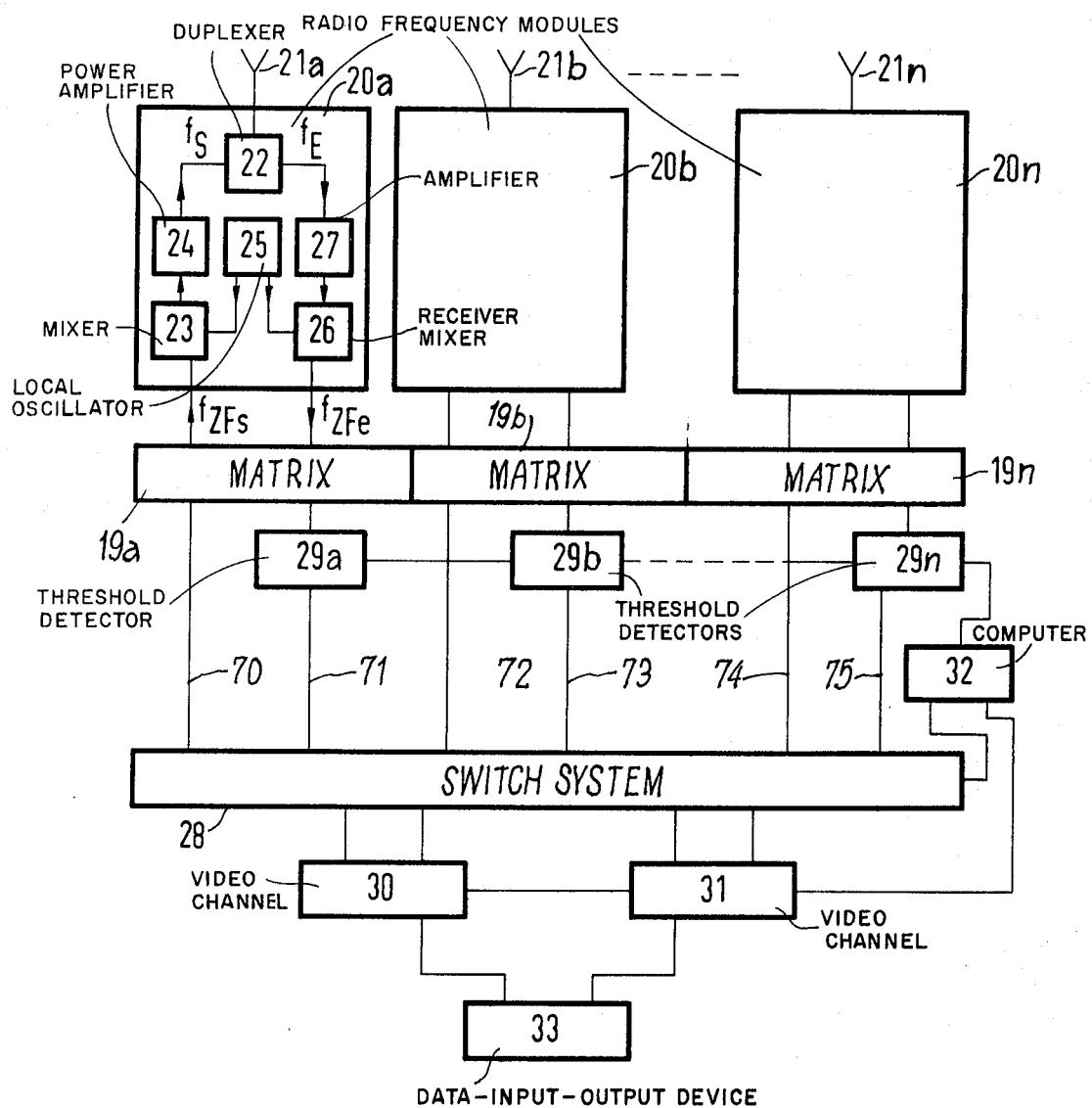
FIG. 7 is a block diagram of an aircraft transponder wherein the matrix and switching of the antenna system is accomplished in the intermediate frequency stage.

FIG. 7 illustrates a system in which the phase-shifting matrix is mounted in the intermediate frequency stage of the aircraft transponder system. Each of the radiating elements 21a, 21b–21n are connected to radio frequency modules 20a–20n. The module 20a, for example, includes a duplexer 22 which is connected to radiator 21a. Duplexer supplies an input at frequency $f_E$ to an amplifier 27 which has its output connected to a receiver-mixer 26. A mixer 23 also receives an input from local oscillator 25. Mixer 23 supplies a radio frequency output to the power amplifier 24 which supplies a signal to the duplexer 22 which applies it to the radiating element 21a. Thus the mixer 23 converts the intermediate frequency signal $f_{ZFs}$ to a radio frequency signal $f_S$ which is radiated. The output of the receiver mixer 26 is at an intermediate frequency $f_{ZFe}$. The intermediate frequencies $f_{ZFs}$ and $f_{ZFe}$ can be reunited and supplied to the matrix 19a. However, if the resulting band widths in the matrix 19 can just be realized, these signals can be applied to separate matrices, one for each frequency. A switch system 28 applies inputs to the matrices 19a–19n to control the phase of the signals on the radiating elements 21a–21n. The switch system 28 may be controlled by a computer having a path-data program control designated as 32 or the switch system 28 may be controlled by threshold detectors 29a–29n which monitor the various possible beam directions and position the switch 28 so as to obtain the optimum reception conditions. The switch system 28 connects the matrix output directly to the two video channels 30 and 31 associated with the two satellites being utilized. Data input and output device 33 provides navigation as well as communication inputs and outputs to the video channels 30 and 31.

The utilization of the phase rotation in the intermediate frequency stage has a number of advantages over systems wherein the matrix is in the radio frequency stage. One of the main advantages being that the overall system gain may be made greater by switching in the intermediate frequency stage wherein the semiconductor elements are used in producing the microwave energy.

It is seen that this invention provides a simple antenna control system for aircraft navigation and although it has been described with respect to preferred embodiments it is not to be so limited as changes and modifications may be made therein which are within the full intent and scope as defined by the appended claims.

I claim as my invention:

1. An aircraft navigation antenna system for simultaneously covering two synchronous satellites of a satellite navigation system comprising:
an electronically phase-controlled antenna array with a plurality of individual radiators which are mounted on the aircraft and which can be controlled for the production of several mutually independent, differently directed beams at an operational frequency by phase controlling the feed to the different radiators with a Butler matrix consisting of a pair of feed lines with inductances in series and phase rotation members across said feed lines and wherein the number of inputs corresponds to the number of individual radiators so that the maximum number of mutually independent selectable beam directions coincides with the number of radiators; and
a computer carried on said aircraft with a memory in which is stored a known flight path and said computer connected to said Butler matrix to select the correct beam directions during the flight by switching to the correct inputs of said Butler matrix.

2. An aircraft navigation antenna system for simultaneously covering two synchronous satellites of a satellite navigation system comprising:
an electronically phase-controlled antenna array with a plurality of individual radiators which are mounted on the aircraft and which can be controlled for the production of several mutually independent, differently directed beams at an operational frequency by phase controlling the feed to the different radiators with a Butler matrix consisting of a pair of feed lines with inductances in series and phase rotation members across said feed lines and wherein the number of inputs corresponds to the number of individual radiators so that the maximum number of mutually independent selectable beam directions conincides with the number of radiators; and
a threshold value detector on said aircraft which examines all beam directions and selects the direction of optimum reception and controls the inputs of said Butler matrix to obtain the optimum beam directions.

3. An aircraft navigation antenna system according to claim 1, wherein said antenna array is fed by a transmitter and the Butler matrix is connected in the high frequency stage.

4. An aircraft navigation antenna system according to claim 1, wherein an active transmission-reception radio frequency stage is connected to each individual radiator and said Butler matrix is connected in the intermediate frequency stage.

5. An aircraft navigation antenna system according to claim 1, wherein said Butler matrix is a 3 db coupler with two inputs and with a decoupling network mounted therebetween and when one input is fed, emits signals at said outputs which have been shifted 90° in phase, and, when the other input is fed emits signals which have phases at the output side that are opposite to those which occur when said one input is fed.

6. An aircraft navigation antenna system according to claim 1, wherein diode switches are provided for switching the inputs of said Butler matrix.

7. An antenna array for an aircraft navigation system utilizing a pair of earth satellites and a ground station wherein said antenna array is mounted on an aircraft and has a first portion controllable to provide a beam directed at the first satellite and a second portion controllable to provide a beam directed at the second satellite, each of said portions of antenna array comprising:

a plurality of radiating elements;

a pair of phase control matrices respectively connected to the radiating elements of said first and second portions and each having a number of input terminals corresponding to said radiating elements;

a pair of switching means connected to said pair of phase control matrices to select particular input terminals control means connected to said pair of switching means to select the particular input terminals which provide beams directed at said satellites; and a pair of signal processing means connected to said switching means for receiving and transmitting intelligence via said antenna array.

8. An antenna array according to claim 7, wherein said control means comprises a computer with a memory in which is stored a record of flight of aircraft over the same course.

9. An antenna array according to claim 7, wherein said control means comprises a threshold circuit which samples all beam directions and controls said pair of switching means so that said first and second portions provide beams aimed at said pair of satellites.

10. An antenna array according to claim 7, wherein said pair of phase control matrices are in a radio frequency stage.

11. An antenna array according to claim 7, wherein said pair of phase control matrices are in an intermediate frequency stage.

* * * * *